(12) United States Patent
Hessler et al.

(10) Patent No.: US 11,245,504 B2
(45) Date of Patent: Feb. 8, 2022

(54) CONTROL SIGNALING FOR A RADIO ACCESS NETWORK

(71) Applicant: Telefonaktiebolaget LM Ericsson (publ), Stockholm (SE)

(72) Inventors: Martin Hessler, Linköping (SE); Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 18 days.

(21) Appl. No.: 16/630,748

(22) PCT Filed: Jul. 25, 2017

(86) PCT No.: PCT/SE2017/050795
§ 371 (c)(1),
(2) Date: Jan. 13, 2020

(87) PCT Pub. No.: WO2019/022653
PCT Pub. Date: Jan. 31, 2019

(65) Prior Publication Data
US 2020/0177339 A1    Jun. 4, 2020

(51) Int. Cl.
*H04W 4/00*       (2018.01)
*H04L 5/00*       (2006.01)
*H04W 72/12*      (2009.01)

(52) U.S. Cl.
CPC ............ *H04L 5/0051* (2013.01); *H04L 5/001* (2013.01); *H04L 5/0082* (2013.01); *H04L 5/0091* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2014/0036809 A1 | 2/2014 | Xu et al. | |
| 2018/0220400 A1* | 8/2018 | Nogami | H04L 5/0078 |
| 2018/0324770 A1* | 11/2018 | Nogami | H04L 5/005 |
| 2018/0343628 A1* | 11/2018 | Abedini | H04W 56/001 |
| 2019/0141737 A1* | 5/2019 | Kim | H04W 72/0446 |
| 2020/0154467 A1* | 5/2020 | Gong | H04W 24/08 |
| 2020/0322108 A1* | 10/2020 | Liu | H04L 5/0082 |
| 2020/0396036 A1* | 12/2020 | Cheng | H04L 5/0048 |
| 2021/0126749 A1* | 4/2021 | Iyer | H04B 7/0482 |
| 2021/0160747 A1* | 5/2021 | Yiu | H04W 36/30 |

OTHER PUBLICATIONS

International Search Report and Written Opinion dated Mar. 21, 2018 for International Application No. PCT/SE2017/050795 filed on Jul. 25, 2017, consisting of 11-pages.

(Continued)

*Primary Examiner* — Phirin Sam
(74) *Attorney, Agent, or Firm* — Christopher & Weisberg, P.A.

(57) ABSTRACT

There is disclosed a method of operating a radio node in a radio access network. The method includes configuring a user equipment with a signaling configuration message, the signaling configuration message indicating a parametrisation pertaining to reference signaling to be transmitted by the user equipment and to communication signaling to be received by the user equipment. The disclosure also pertains to related devices and methods.

23 Claims, 5 Drawing Sheets

(56) References Cited

OTHER PUBLICATIONS

RI-1711049-ERICSSON: "On SRS Design", 3GPP Draft; On SRS Design, -3rd Generation Partnershi P Project (3GPP), Mobi Le Competence Centre ; 650, Route Des Lucioles ; F-06921 Sophia-Anti Polis Cedex France ;vol. RAN WGI, No. Qingdao, China; Jun. 17, 2017 , XP051305346, consisting of 8-pages.
RI-1708709-ERICSSON: "SRS Design", 3GPP Draft;, 3rd Generation; Partnershi P Project (3GPP), Mobile Compei Ence Centre ; 650, Route Des Lucioles ; F-06921 Sophia-Anti Polis Cedex France vol. RAN WGI, No. Hangzhou, China;May 14, 2017, XP051273892; consisting of 10-pages.
RI-1708928-NOKIA et al.: UL SRS design considerations i n NR II; 3GPP Draft; 3rd Generation Partnership Project (3GPP), Mobi Le Competence Centre; 650, Route Des Lucioles; F-06921 Sophia-Anti Polis Cedex France -vol. RAN WGI, No. Hangzhou,May 14, 2017 (May 14, 2017), XP051274106 consisting of 7-pages.

* cited by examiner

CONTROL SIGNALING FOR A RADIO ACCESS NETWORK

CROSS-REFERENCE TO RELATED APPLICATIONS

This application is a Submission Under 35 U.S.C. § 371 for U.S. National Stage Patent Application of International Application Number: PCT/SE2017/050795, filed Jul. 25, 2017 entitled "CONTROL SIGNALING FOR A RADIO ACCESS NETWORK," the entirety of which is incorporated herein by reference.

TECHNICAL FIELD

This disclosure pertains to wireless communication technology, in particular to in the context of a radio access network (RAN) like a NR (New Radio) based network.

BACKGROUND

Modern wireless communication systems are designed to be flexible and usable on short timescales, e.g. in terms of latency. Moreover, with the introduction of ever higher frequencies and increasing sources of transmissions (e.g., users), channel conditions (influencing signal quality) may vary ever more quickly, e.g. due to the speed of participants, or to strong reaction to short-term influences.

A possible approach for improving communication is utilising the concept of reciprocity, according to which transmissions may be based on received reference signaling having the same or similar frequency range. For this approach, it is useful to provide the reference signaling and the transmissions close in time to each other, such that channel conditions are represented reasonably well by the reference signaling. Thus, reciprocity is one example for which quick changes in direction of communication may be required.

Especially in such contexts, new and improved control signaling approaches are desirable.

SUMMARY

It is an object of this disclosure to provide approaches allowing improved handling of signaling, in particular by discussing control signaling with low overhead. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. The approaches may in particular be implemented for VL-MIMO.

Accordingly, there is disclosed a method of operating a radio node in a radio access network. The method comprises configuring a user equipment, or a second radio node (e.g., via a backhaul link) with a signaling configuration message, the signaling configuration message indicating a parametrisation pertaining to reference signaling to be transmitted by the user equipment, or the second radio node, and to communication signaling to be received by the user equipment, or the second radio node.

Also, there is disclosed a radio node for a radio access network. The radio node is adapted for configuring a user equipment, or a second radio node, with a signaling configuration message, the signaling configuration message indicating a parametrisation pertaining to reference signaling to be transmitted by the user equipment, or the second radio node, and to communication signaling to be received by the user equipment, or the second radio node. The radio node may comprise, and/or be adapted for utilising, processing circuitry and/or radio circuitry, in particular a transceiver and/or transmitter and/or receiver, for such configuring. Alternatively, or additionally, the radio node may comprise a configuring module for such configuring.

A method of operating a user equipment, or a second radio node, in a radio access network may be considered. The method comprises transmitting reference signaling based on a configuration, the configuration being configured based on a received signaling configuration message. The signaling configuration message indicates a parametrisation pertaining to the reference signaling and to communication signaling to be received by the user equipment, or the second radio node.

Also, there is proposed a user equipment, or a second radio node, for a radio access network. The user equipment, or the second radio node, is adapted for transmitting reference signaling based on a configuration, the configuration being configured based on a received signaling configuration message, the signaling configuration message indicating a parametrisation pertaining to the reference signaling and to reception signaling to be received by the user equipment, or the second radio node. The user equipment, or the second radio node, may comprise, and/or be adapted for utilising, processing circuitry and/or radio circuitry, in particular a transceiver and/or transmitter and/or receiver, for such transmitting, and/or for receiving the message. Alternatively, or additionally, the radio node may comprise a transmitting module for such transmitting, and/or a receiving module for receiving the message.

The radio node may in particular be a network node, e.g. a base station like an eNB or gNB. The second radio node may be network node, e.g. a network node like a relay node or base station or node in a heterogeneous network or secondary node. The radio node and the second radio node may communicate via a (wireless) backhaul link.

Generally, the reference signaling may be sounding reference signaling, in particular SRS (Sounding Reference Signaling) or pilot signaling. The reference signaling may generally be signaling transmitted with defined (e.g., predefined and/or configured) characteristics, enabling the receiving node (network node) to e.g. determined or estimate channel quality and/or signal strength and/or power level and/or interference and/or noise. Alternatively, or additionally, the communication signaling may be physical downlink or sidelink signaling. The communication signaling may in particular be data signaling, and/or be associated to a data channel. Generally, the reference signaling and the communication signaling may be scheduled and/or configured by control signaling, e.g. the signaling configuration message and/or another message, e.g. a downlink or sidelink control information message.

It may be considered that, in general, the reference signaling and the communication signaling are scheduled and/or intended and/or transmitted in different (e.g., opposing or complementary) communication directions, e.g. for different sidelink directions or for uplink/downlink.

In some variants, the signaling configuration message may be a downlink, or sidelink, control information message, for example a DCI (Downlink Control Information) or SCI (Sidelink Control Information) message. The message may generally be in the same direction, and/or transmitted by the same device or node, as the (intended or scheduled or transmitted) communication signaling. Generally, the signaling configuration message may be in the context of, and/or for, dynamic signaling/configuring.

It may be considered that a parametrisation comprises one or more parameters pertaining to the reference signaling and the communication signaling. A parameter pertaining to signaling may generally indicate a transmission characteristic of the signaling, e.g. resource/s and/or timing and/or modulation (in particular, MCS) and/or port. The parametrisation indicated by the signaling configuration message may be indicated in part, e.g. complemented by other information, which may be configured and/or predefined. For example, resource/s and modulation may be indicated separately, e.g. in separate messages. Generally, the parametrisation indicated does not have to be a complete parametrisation of the associated signaling/s, but may cover only a part or one or more aspects of the signaling, in particular frequency and/or timing and/or code (respectively, frequency and/or time and/or code resources) and/or modulation.

The parametrisation may generally be indicated by at least one common indicator, the common indicator mapping to at least one parameter of the reference signaling and at least one parameter of the communication signaling. An indicator may be considered to map to a parameter if it is possible to determine the parameter based on the indicator, e.g. due to a functional or relational link (in particular, a mathematical link) and/or a predefined mapping, for example based on a table, list, and/or sequence. An indicator may be represented by a value and/or bit pattern (e.g., a field), which may comprise one or more bits. It may be considered that the indicator is represented by a specific value or pattern. An indicator may be considered to be common if it pertains to different signalings, in particular to reference signaling and communication signaling. Generally, a common indicator may be mapped differently to different signalings, e.g. based on different mathematical links or different tables/table content. In particular, different resources may be mapped to different signalings based on the same common indicator. A common indicator may be represented by a field or bit field, which may comprise one or more bits in size. The field may for example pertain to frequency resources (frequency allocation), and/or port and/or power and/or another transmission characteristic or parameter.

In particular, the parametrisation may pertain to frequency resources of the reference signaling (which may be referred to as reference frequency resources) and frequency resources of the communication signaling (which may be referred to as communication frequency resources). The frequency resources may be the same, or may be different. In particular, the reference frequency resources for may be and/or comprise a subset or one or more subranges of the (set of and/or range of) frequency resources for the communication signaling, which may be smaller (in particular in total frequency resources, e.g., resource elements and/or subcarriers and/or frequency interval/s or range/s) than the set of frequency resources for the communications signaling. Both frequency resources may be represented by (e.g., different) sets of resources, e.g. resource elements and/or subcarriers, and/or or one or more frequency ranges. A frequency range may be considered to represent a continuous frequency interval (between an upper and lower border frequency). It should be noted a resource element may be considered representative of its frequency domain extension. A set or subset of resources may comprise one or more resource elements and/or one or more subcarriers and/or one or more ranges (in which subcarriers or resource elements may be arranged or comprised such that each neighbours at least one other of the same range in frequency domain, and/or that they are continuous within the range or interval).

In some variants, the parametrisation may pertain to a first set of frequency resources of the reference signaling, the first set being a subset of a second set of frequency resources of the communication signaling. The first set may be smaller than the second set. The first and second sets may be represented by subcarriers and/or resource elements. The first set may comprise a pattern of resource elements, which may comprise one or more subsets or subpatterns, wherein between subpatterns or subsets there may be frequency ranges/subcarriers not associated to the first set. For example, the first set may comprise a comb-structure, in which one or more subcarriers not belonging to the first set separate two subcarriers, and/or subpatterns of subcarriers representing a continuous frequency range, of the first set.

Generally, the communication frequency range, respectively the second set of frequency resources, may belong to, and/or be associated to, and/or be included in, the same carrier and/or resource structure, e.g. Physical Resource Block, as the reference frequency range, respectively the first set of frequency resources. The reference signaling may cover (e.g., when transmitted, or as configured/scheduled/intended) an extension in time domain of one or more symbol time lengths, e.g. 1, 2, 3 or 4, e.g. mapped to corresponding symbols. This extension may be configured or configurable, e.g. by the signaling configuration message, or another control message like a DCI message or a RRC message. The communication signaling may cover (e.g., as transmitted, or as configured/scheduled/intended) an extension in time domain of one or more slots or mini-slots. It should be noted that the symbol time length, and thus the extension in time domain of signaling, may be dependent on numerology used, in particular on subcarrier spacing (SCS). The numerology may be configured or configurable. Numerology may generally refer to different subcarrier spacings used within one RAT (intra-RAT), e.g. NR. The symbols covered by reference signaling (in particular, one occurrence thereof, and/or for one transmission timing structure like a slot or mini-slot) may be continuous in time, such that each symbol neighbours at least one other symbol for which reference signaling is scheduled and/or transmitted. For different symbols, the reference signaling may cover different frequency resources, e.g. representing different parts and/or ranges of frequency resources scheduled for communication signaling.

It may be considered that the parametrisation of the communication signaling is further indicated by a second configuration message, which may in particular be transmitted in control signaling and/or as downlink control information or sidelink control information like DCI or SCI, respectively. The second configuration message may comprise one or more additional parameter/s pertaining to the communication signaling. It may be considered that the second configuration message is transmitted in time between the reference signaling and the communication signaling.

Generally, transmission of the communication signaling may be based on the reference signaling. For example, the communications signaling may be transmitted with one or transmission characteristics being determined in response to the received reference signaling, and/or based on an evaluation thereof. The network node may be adapted for such determining and/or evaluation, for example utilising processing circuitry and/or radio circuitry, in particular a receiver, for therefor. Alternatively, or additionally, the network node may comprise a corresponding determining module and/or a corresponding receiving module and/or a corresponding evaluation module. Evaluation and/or determining may comprise receiving and/or performing measurement/s on the reference signaling, and/or processing thereon, for example comparing with threshold and/or target value/s and/or determining or estimating channel quality or channel state or interference or noise. The transmission characteristic may in particular pertain to modulation (e.g., MCS, and/or in the context of link adaptation) and/or power level and/or signal quality and/or encoding and/or a repetition rate (e.g., in the context of machine type communication and/or transmission with a high reliability demand like URLLC) and/or precoding, e.g. one or more precoders. It may in general be considered that the network node chooses one or more transmission characteristics of the communication signaling as based on the received reference signaling, for example to adapted to channel quality/conditions.

The communication signaling may be seen as reciprocal to the reference signaling. In particular, the reference signaling may be parametrised to (and/or be indicated or selected to) represent the channel conditions/channel quality/channel state for the communication signaling, e.g. to be representative therefor. For example, the frequency resources indicated and/or used for the reference signaling may allow channel estimation of frequency resources indicated and/or used for the communication signaling. In this context, it may be sufficient if the reference signaling covers, in frequency domain, a subset of the communication frequency resources, such that for example for one or more or each subrange of the communication frequency resources, a smaller subrange/subpattern of reference signaling is representative of the channel (e.g., conditions or quality or state). Alternatively, or additionally, the frequency resources for reference signaling may be associated and/or distributed to cover one or more frequency ranges overlapping and/or coinciding with one or more frequency ranges associated to the frequency resources for the communication signaling. A frequency range may be considered to be covered by frequency resources, if corresponding signaling is scheduled or transmitted or configured at least on an upper border frequency (and/or subcarrier) and a lower border frequency of the frequency range (and/or subcarrier). A distribution pattern inside the range may indicated frequency (sub)range of signaling, and ranges without such corresponding signaling, e.g. a pattern of subcarriers associated to the corresponding (e.g., reference or communication) signaling with interspersed subcarrier without such signaling. Two frequency ranges may be considered to overlap, if at least one of an upper or lower border of one frequency range is within the other frequency range, or if they are identical, or if they share at least one subcarrier. It should be noted that it is not required for frequency ranges to overlap or coincide in this context that they actually comprise common frequency subranges or subcarrier groupings assigned for both communication and reference signaling. For example, subcarriers for reference signaling may be different from subcarriers for communication signaling in overlapping frequency ranges. However, in some variants commonly used subcarriers (for both signalings) may be in overlapping frequency ranges, for example in addition to one or more subcarriers associated to only one of the signalings, and/or one or more subcarriers associated to neither the reference signaling and the communication signaling. In some variants, a subcarrier of reference signaling may be indicative or representative of the channel of a group of subcarriers close in frequency thereof, e.g. 2 or 3 or 4 or more subcarriers (which may include the subcarrier of the reference signaling), and/or one or more physical resource blocks (a PRB may be considered to represent is associated frequency range in this context, e.g. 12 subcarriers or a fraction thereof). A comb may be used for the reference signaling to provide a corresponding pattern, wherein the comb may be arranged in the frequency range intended and/or scheduled and/or configured for the communication signaling. A comb may generally indicate a pattern of subcarriers or subcarrier groupings, wherein between subcarrier groupings on which signaling of a type (e.g., reference signaling) is scheduled and/or transmitted and/or configured is interspersed a subcarrier grouping (of the same or different size) without such signaling of this type. In particular, a precoder for communication signaling may be determined based on the reference signaling, and/or measurement/s performed on the reference signaling.

The communication signaling may be associated to a data channel, e.g. a shared channel like a physical downlink or sidelink shared channel, or to a dedicated channel, e.g. a downlink or sidelink dedicated channel. Other examples of data channels comprise a channel for low latency and/or high reliability transmission, in particular a channel for Ultra-Reliable Low Latency Communication (URLLC).

The communication signaling may in general be scheduled or transmitted later in time than the reference signaling, in particular one or more, for example one, two or three symbol time intervals later in time. The timing difference between the signalings may be adapted, and/or be determined or configured, to allow for, and/or may be utilised for, receiving and/or processing, e.g. demodulating/decoding, and/or for adapting the transmission (respectively, its parametrisation) for the communication signaling based on the reference signaling. Thus, the communication signaling may be reciprocal to the reference signaling. The parametrisation, and/or a configuration indicting time resources for the reference signaling and the communication signaling may be determined and/or configured based, and/or to account for, such a timing difference.

Generally, the communication signaling and the reference signaling may be scheduled for, and/or transmitted in, the same transmission timing structure, e.g. slot, or in neighboring (in time) structures. For example, the reference signaling may be associated to a first transmission timing structure, e.g. a first slot or mini-slot, and the communication signaling may be associated to a second transmission timing structure succeeding the first structure, which may be the next structure in time (e.g., with a common border or neighbouring or directly following, in particular in the case of slots). It should be noted that transmissions scheduled for neighbouring transmission timing structures do not have to be neighboured in time, there may be intermediate symbols between, e.g. for processing of signaling. In some cases, reference signaling may be associated to a mini-slot, which may be scheduled and/or transmitted within a slot for which (at a later time) the communication signaling is scheduled and/or transmitted. This may be particularly useful for low latency applications.

Frequency resources for reference signaling, and/or the associated reference signaling, may be considered representative of frequency resources for communication signaling, if they cover at least part or parts thereof, and/or allow channel quality determination and/or estimation for the frequency resources for communication signaling. For different frequency ranges, corresponding patterns of reference signaling inside a frequency range for communication signaling may be different. For example, for lower frequencies, one subcarrier for reference signaling may be sufficient to represent more subcarriers of communication signaling than for higher frequencies, or vice versa. This may depend on operation conditions and/or subcarrier spacing/numerology, and/or may be configured or configurable.

There is also disclosed a program product comprising instructions causing processing circuitry to control and/or perform any one of the methods described herein.

Moreover, a carrier medium arrangement carrying and/or storing a program product as disclosed herein may be considered.

The approaches described herein enable efficient handling of control signaling with limited overhead, in particular for use case in which communication signaling is reciprocal to reference signaling, such that the communication signaling is transmitted with one or more transmission characteristics or a corresponding parametrisation (e.g. pertaining to transmission power, and/or modulation, and/or repetition rate) based on the reference signaling, e.g. a channel estimate determined based on the reference signaling.

BRIEF DESCRIPTION OF THE DRAWINGS

The drawings are provided to illustrate concepts and approaches described herein, and are not intended to limit their scope. The drawings comprise.

DETAILED DESCRIPTION

Mobile data traffic is growing exponentially due to the enormous success of smart phones, tablets and other data traffic appliances. The traditional way for increasing the data rate had been to increase the transmission bandwidth. However, spectrum has become scarce due to the increase in wireless access systems. Hence, a challenge for the future wireless access systems is to find alternative solutions to meet high demands on the data rate. One way of handling the increased wireless data traffic is to deploy more base stations (BS) and densify the cellular network. This would, however, increase interference and deployment cost. Another, seemingly simpler in terms of deployment cost, option for increasing the system capacity is to introduce large antenna arrays at the BS. The BS, with sufficient number of antennas, can simultaneously schedule multiple terminals at the same time/frequency resource with simple linear processing, such as maximum-ratio transmission (MRT) or zero-forcing (ZF) in the downlink and maximum-ratio combining (MRC) or ZF in the uplink. This is often referred to as very large (VL) multi-user (MU) multiple-input-multiple-output (MIMO), and is abbreviated by VL-MIMO hereafter. VL-MIMO is also sometimes referred to as massive MIMO.

An important challenge in deploying VL-MIMO, but also in other setups, is how to acquire channel state information (CSI) or similar information regarding channel quality. Also, the question on how and when to provide related signaling like control signaling and/or reference signaling, impacts on system performance, in particular for VL-MIMO.

For NR as an example, it is suggested utilizing a SRS design to acquire reciprocity based channel state information about the DL for precoder calculations. Accordingly, MU multiplexing and link-budget handling may be improved. Moreover, dynamic SRS transmissions triggered in DCI may be facilitated.

Figure 1:
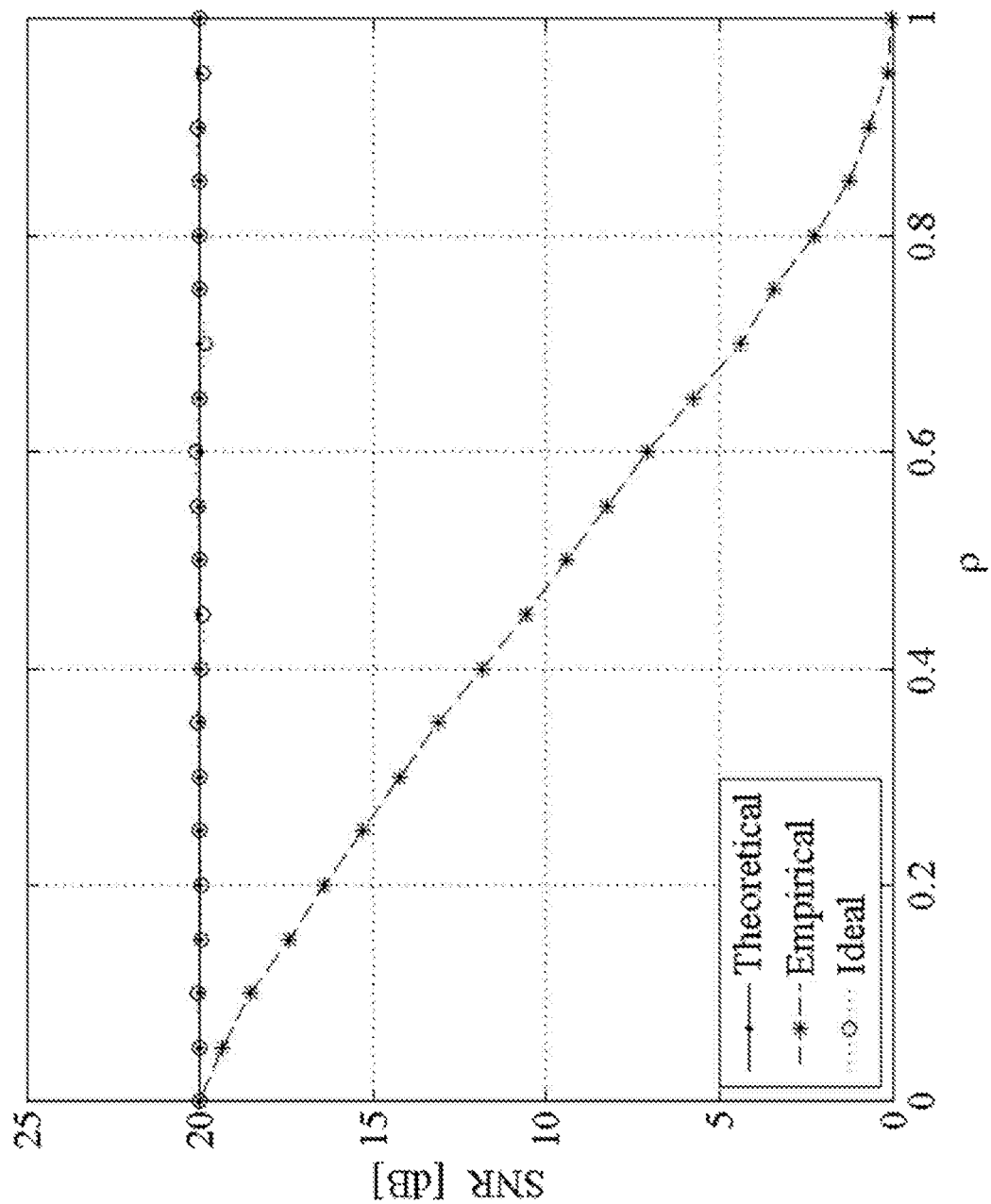
FIG. 1, showing exemplary average SNR values for different values of channel correlation (for M=100)

To get a quantitative understanding of how inaccurate CSI affect the performance, a simple experiment is illustrated. A multiple-input-single-output (MISO) system with M=100 input antennas and maximum ratio transmission is considered. Mathematically, this can be expressed by $$y=\sqrt{P}hwq+e, \qquad \text{(eq. 1)}$$

wherein P is the transmitted power, h denotes the M×1 channel vector, w is the 1×M precoding vector, q is the unit-energy transmitted symbol and e is zero-mean additive white Gaussian noise with variance Ideally, the MRT precoder is $$w = \frac{h^*}{\|h\|},$$

which results in an average received signal-to-noise-ratio (SNR) that scales as M. In practice, the channel might change from the measurement to the actual transmission. This is statistically modeled via assuming that the channel correlation between the measurement and the transmission is given by 1−ρ, where, ρ=0 means that the channel remains the same and ρ=1 means that the channels are uncorrelated between measurement and the transmission. The results are plotted in FIG. 1. In this figure, the transmitted SNR is set to 1, $$\text{i.e., } \frac{P}{\sigma^2} = 1$$

and fast Rayleigh fading scenarios are assumed, wherein the elements of h are circularly symmetric Gaussian random variables with mean zero and variance 1. As can be seen, for ρ=0.15, the received SNR decreases by half, which illustrates how sensitive the MRT is with respect to the accuracy of the CSI. Similar conclusions are observed for a ZF precoder. The conjugate transpose (also known as Hermitian transpose) of a vector or a matrix is denoted using the superscripts *. Mathematically, for the m×n matrix A, A* is an n×m matrix with $A^*_{i,j}=\overline{A}_{i,j}$. Moreover, $A^T$ denotes the transpose of the matrix A, and $A^+$ denotes the pseudoinverse of the matrix A defined as $A^+=A^*(AA^*)^{-1}$.

For NR, it is agreed that an UL SRS signal (representing exemplary reference signaling) should be supported, that may be used for reciprocity DL transmission (e.g., transmission of communications signaling in downlink based on received SRS signaling). Good CSI based on the reference signaling may be based on the UE sounding all the frequency resources that should be used for DL signaling (e.g., in MU-MIMO), or at least frequency range/s representing these frequency resources, with a good spectral power density as close in time as possible to the DL transmission. Hence the best is to sound exactly the same frequency resources as the resources that should be used for the data transmission, or a representative part or subset thereof. Sounding in the context of this disclosure may be considered to pertain to transmitting reference signaling, in particular SRS, to allow channel estimation of associated frequency resources or range/s.

It is proposed that SRS may be triggered in a dynamic fashion, e.g. using a DCI message. The problem in this case is that to be very selective and/or flexible in the sounding, to identify the relevant frequency resources and/or limiting sounding thereto could demand high overhead in the DCI. For periodic type of SRS (non-dynamic, or semi-persistent or semi-static, e.g. configured using RRC signaling), the configuration overhead is less, as the configuration cost is distributed over multiple SRS transmissions. However, with such periodic SRS, mismatch between the time when SRS is transmitted giving old CSI and/or which frequency resources that are sounded may occur. A periodic SRS also gives higher SRS overhead and interference due to that SRS is transmitted independent if it is needed or not.

SRS in NR may be triggered (triggering may be used in the context of configuring) dynamically, in particular close in time to a data transmission. But this gives high DCI overhead, due to two DCIs (one for SRS, one for the data, e.g. a scheduling assignment) are needed.

Figure 2:
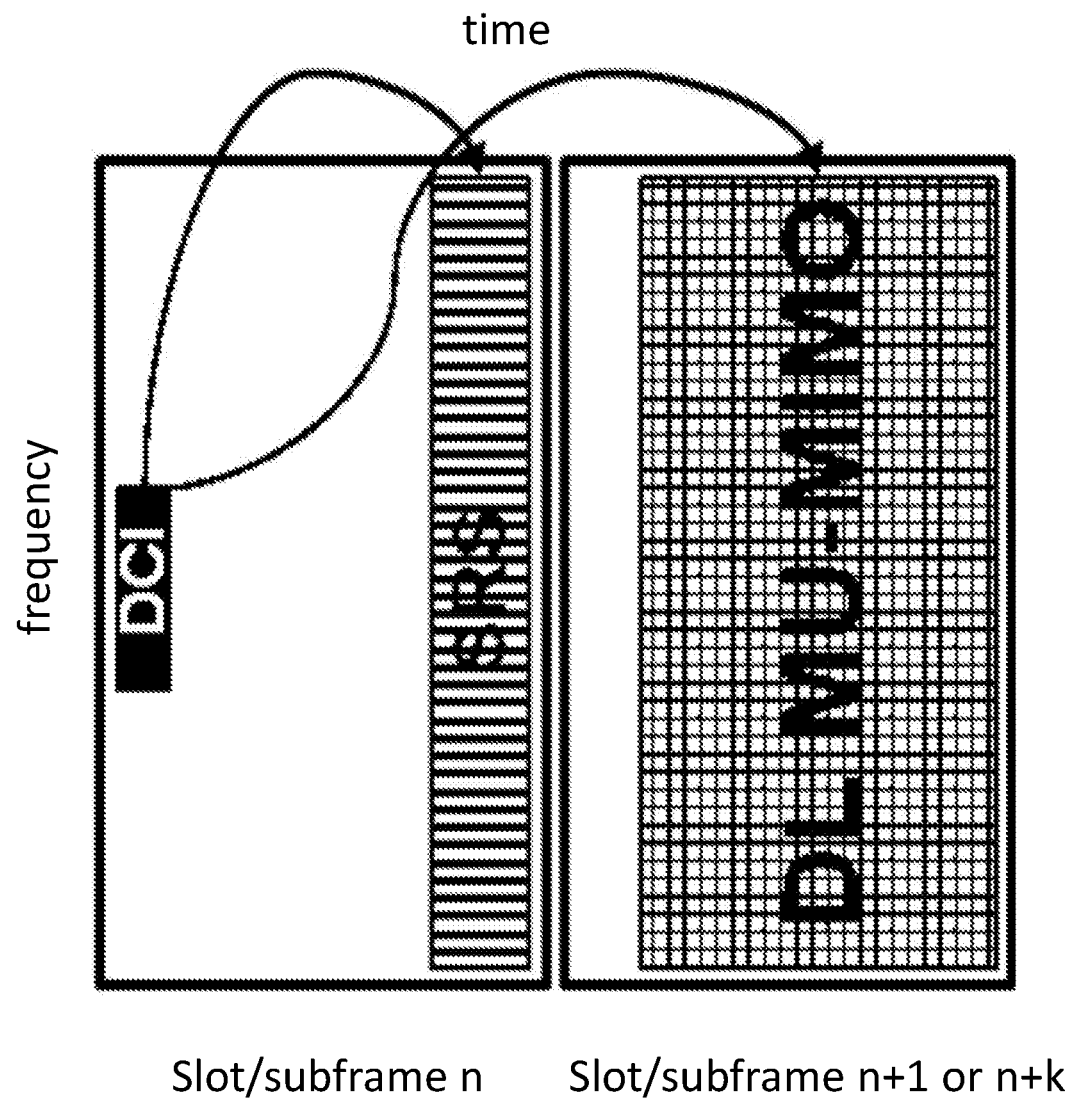
FIG. 2, showing an exemplary signaling configuration message (indicated as DCI)

To reduce overhead, a joint frequency encoding for the SRS and PDSCH is proposed, which may be considered to represent a parametrisation pertaining to both reference signaling (SRS) and communication signaling (PDSCH). The joint encoding may for example be in one DCI message (the information in one message may be considered to be jointly encoded). An example is depicted in FIG. 2, showing how the DCI, e.g. on PDCCH, is transmitted prior to the SRS (configuring the SRS) in slot or sub-frame n. The DCI, representing a signaling configuration message, pertains to both the SRS and later communication signaling indicated as DL MU-MIMO, e.g. on a PDSCH. For example, the frequency resources for the PDSCH transmission (representing the communication signaling/data) may be indicated (scheduling the UE for reception thereon), as well as a subset thereof for SRS transmission. Based on the SRS, the configuring node (transmitting the DCI, e.g. a network node) may determine or estimate channel quality (the SRS may be considered to be basis for, and/or be used for determining, by the configuring node, CSI) for the following DL data transmission (communication signaling) in slot/sub-frame n+1 or n+k.

In general, SRS can be in slot or sub-frame n, and the data transmission in slot or sub-frame n+k for any positive value k. However, in some cases k may be zero, for example if the reference signaling and/or communication signaling are scheduled for mini-slots, or for low-latency cases.

It may be considered to provide two DCI messages, wherein the second may be transmitted in time before the reference signaling, or between the reference signaling/SRS and the communication signaling, and in this case in particular may pertain to the latter. It should be noted that the second DCI message may be transmitted during the processing time of reference signaling, and for example may indicate parameter/s for the communication signaling independent of the reference signaling. Such parameter/s may, e.g., pertain to exact frequency resource distribution, expected feedback signaling, feedback signaling configuration, and/or other characteristic/s. Generally, the encoding of DCI (which may represent the parametrisation for the signalings) can be divided into two PDCCH transmissions or DCI messages. The frequency allocation (indication of frequency resources for the reference signaling and the communication signaling) may be indicated in the first of the two DCI messages/formats (but it be also in the second, as long as the indication is provided before the SRS transmission in time).

Other transmission characteristic/s, alternatively or additionally to frequency resource/s, may be indicated, e.g. by one or more common indicators, such as cyclic shift/s, comb and/or hopping pattern (which may describe shifts in frequency for of signaling, e.g. for frequency diversity), for the reference signaling and/or communication signaling, in particular for use on SRS and/or PDSCH.

A scheme enabling low overhead in the DCI format for signaling a detailed frequency allocation for both SRS and PDSCH data transmission is proposed. The delay between SRS and PDSCH may be minimized by placing the SRS prior and adjacent in time (e.g., separated by one or a low number of symbols, which may accommodate for processing time) to the PDSCH transmission.

Figure 3:
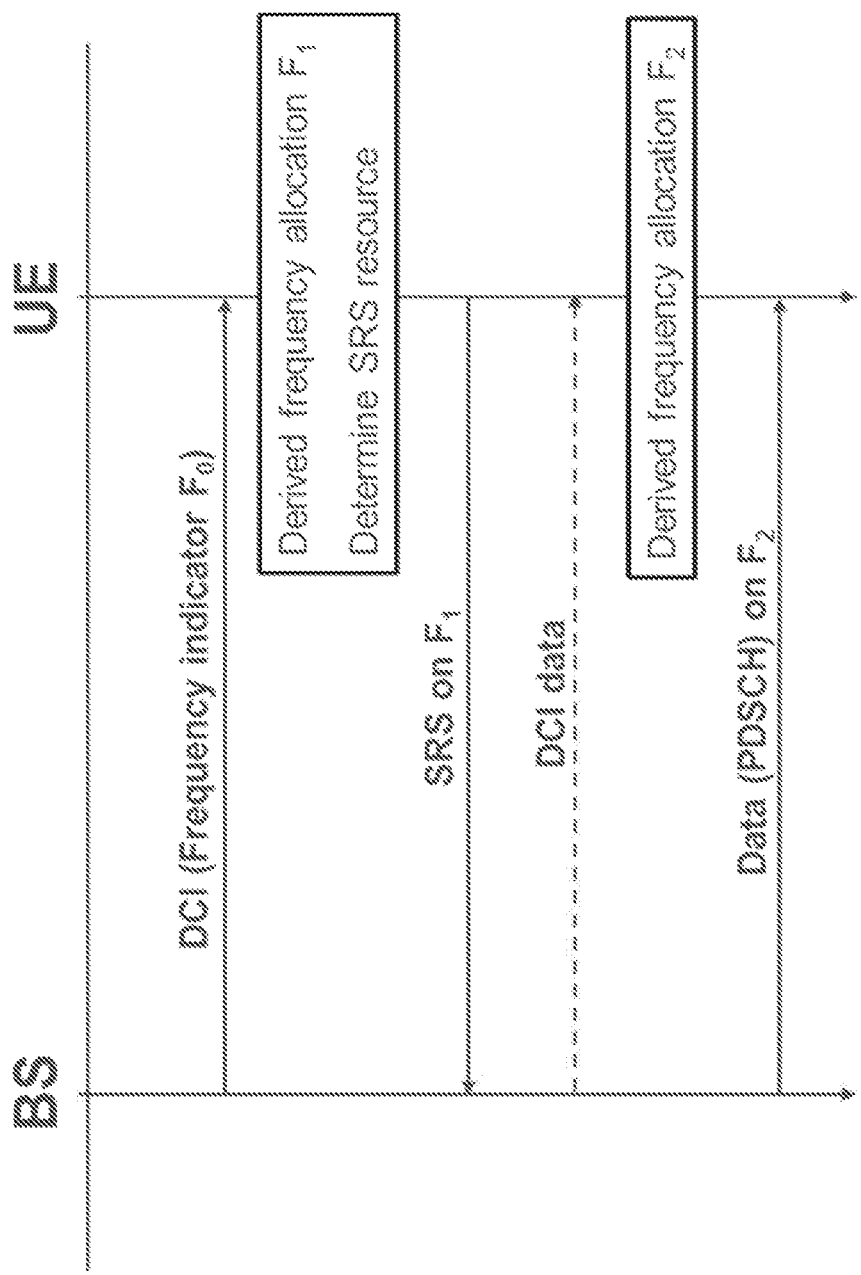
FIG. 3, showing an exemplary signaling diagram.

FIG. 3 shows an exemplary schematic indication signaling between a radio node implemented as base station, BS, and a user equipment UE. The base station BS may transmit a (first) DCI message including a common indicator F0. The UE may, based on F0, derive a frequency allocation (frequency resources allocated) F1, which may be determined as resources for SRS signaling. The UE then may transmit the SRS signaling accordingly, on the frequency resources indicated by F1. The base station may, optionally, and at any time before transmitting data as described below, in particular after receiving the SRS signaling, transmit a second DCI message pertaining to a data transmission (DCI data), e.g. pertaining to a following PDSCH transmission. The UE, after transmitting the SRS signaling, may receive a data transmission (communication signaling), e.g. on PDSCH in frequency resources indicated by frequency allocation F2. F2 may be derived from, and/or based on, the common indicator F0, at any time after reception of the message carrying F0, and before receiving of the data transmission. Receiving of the data transmission may optionally also be based on the second DCI message, which may complement information from the first DCI message.

In a variant, the DCI for SRS and PDSCH may be jointly coded, e.g. in one message.

It may be considered that the scheduling granularity on the PDSCH is different from the granularity on the SRS, e.g. representing different subsets or sets of frequency resources. For example, SRS can be indicated with 4 PRB granularity, while PDSCH may be indicated with 2 PRB granularity. In such cases, the SRS can be taken as super set of the PDSCH, e.g. all 4 PRB blocks intersected by the PDSCH allocation. It is also possible to take only SRS blocks fully covered by PDSCH allocation, this can be for the case when wide band pre-coding is used that does not demand channel estimates for all DL resources.

Alternatively, two DCI message, e.g. two messages relating to SRS and PDSCH transmission, may be considered. For example, a first DCI may be complemented by a second DCI, to provide more complete parametrisations for SRS and/or PDSCH signaling. This second DCI can be very small and may, for example, contain some parameters for the PDSCH transmission. In a minimal DCI only some very basic parameters for the PDSCH may be included. In particular, (most) parameters contained in the first DCI may still valid be valid and/or be unchanged; possibly some fields containing some power offset parameters and/or other parameters related to the transmission format/characteristics of the PDSCH may be included, e.g. to complement the first message, which may comprise completing or adding to a parametrisation.

Alternatively, or additionally, to indicating the frequency allocation (parametrisation of frequency resources for both reference signaling and communication signaling), a port allocation can be indicated with a parametrisation, in particular a common indicator, and/or jointly encoding. That is, two users jointly scheduled on PDSCH with orthogonal ports typically need also orthogonal ports on SRS. A common indicator may be represented by a field indicating the comb, cyclic shift and SRS sequence. Typically, there are more orthogonal ports for SRS, hence the mapping can be such that users assigned with the same ports on DMRS are assigned orthogonal ports on SRS. This may be for the case when they are spatially separated on the DL transmission, e.g. due to corresponding antenna configuration.

It may be considered that in some variants, one or more UEs are configured with multiple OFDM symbols SRS. Hence, the derivation of the frequency allocation (indicated in the signaling configuration message) may be spread over multiple OFDM symbols. For example, for each symbol, there may be allocated, and/or may be associated to, a fraction of the frequency resources for the communication signaling, e.g. the PDSCH bandwidth. This division may be used for orthogonalisation. In some examples, the PDSCH resource allocation may be non-continuous for diversity purposes (e.g. 2 separate blocks) or for other reasons such that the DL data transmission is over multiple carriers. Then the SRS allocation may be split so that each OFDM symbol gets a continuous frequency allocation (if this is not feasible, the disjoint blocks should be at least close to each other). In some embodiments, a 2 carrier DL may be split into 2 OFDM symbols SRS, the first OFDM symbol on the first carrier, the second OFDM symbol on the second carrier. It should be noted that the OFDM symbol herein is an example representing a symbol time length, and may be based on other multiplexing symbols.

DCI reconfiguration according to the SRS resource configuration may be considered. In some examples, a frequency assignment field (or more generally, a common indicator pertaining to frequency resources) in the DCI may be interpreted according to the UE configuration of the SRS. For example, this may pertain to scheduling granularity, and/or the mapping from DMRS ports to SRS ports can be configured on the SRS resource definition to help the orthogonalisation, in particular if there are more SRS ports than there are DMRS ports. It should be noted that such a configuration does not need to be a SRS configuration, but could be included in any configuration message, for example, related to the PDSCH format.

There may be generally considered to jointly code SRS and PDSCH parameter/s for reciprocity transmission, e.g. in one DCI message. In particular, the frequency allocation and/or which ports to use on PDSCH and SRS may be such parameter/s. In this way, overhead due to the strong relation between parameters on the two resources/signalings may be limited.

Figure 4:
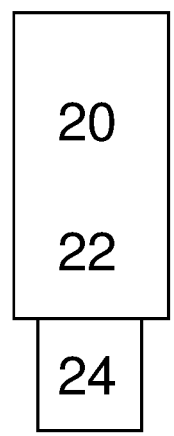
FIG. 4, showing an exemplary radio node implemented as user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
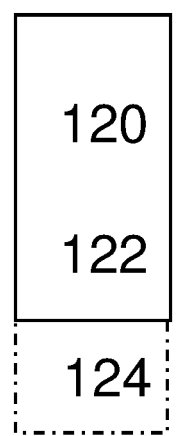
FIG. 5, showing an exemplary radio node implemented as network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing intervals like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH. Resource scheduled for a transmission may be considered allocated (for the transmission) resources.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX.

Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A port may be considered to identify a transmission parameter set, in particular in the context of multi-antenna use. The port may indicate a reference signaling type and/or pattern to be used with the parameter set.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:

| Abbreviation | Explanation |
| --- | --- |
| CBG | Code Block Group |
| CDM | Code Division Multiplex |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DMRS | Demodulation reference signal |
| DM-RS | Demodulation Reference Signal |
| FDM | Frequency Division Multiplex |
| HARQ | Hybrid Automatic Repeat Request |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |

-continued

| Abbreviation | Explanation |
| --- | --- |
| SIR | Signal-to-interference ratio |
| SNR | Signal-to-noise-ratio |
| SR | Scheduling Request |
| SVD | Singular-value decomposition |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a radio node in a radio access network, the method comprising:
configuring a user equipment with a signaling configuration message, the signaling configuration message indicating a parametrisation pertaining to reference signaling to be transmitted by the user equipment and to communication signaling to be received by the user equipment at least in part in response to the reference signaling.

2. The method according to claim 1, wherein at least one of the reference signaling is sounding reference signaling and the communication signaling is one of physical downlink and sidelink signaling.

3. The method according to claim 1, wherein the signaling configuration message is one of a downlink and a sidelink control information message.

4. The method according to claim 1, wherein the parametrisation is indicated by at least one common indicator, the common indicator mapping to at least one parameter of the reference signaling and at least one parameter of the communication signaling.

5. The method according to claim 1, wherein the parametrisation pertains to frequency resources of the reference signaling and frequency resources of the communication signaling.

6. The method according to claim 1, wherein the parametrisation pertains to a first set of frequency resources of the reference signaling, the first set being a subset of a second set of frequency resources of the communication signaling.

7. The method according to claim 1, wherein parametrisation of the communication signaling is further indicated by a second configuration message.

8. The method according to claim 1, wherein transmission of the communication signaling is based on the reference signaling.

9. The method according to claim 1, wherein the communication signaling is associated to one of a data channel, a sidelink shared channel, and a dedicated channel.

10. The method according to claim 1, wherein the communication signaling is one of scheduled and transmitted one of one, two and three symbol time intervals later in time than the reference signaling.

11. A radio node for a radio access network, the radio node being configured to:
configure a user equipment with a signaling configuration message, the signaling configuration message indicating a parametrisation pertaining to reference signaling to be transmitted by the user equipment and to communication signaling to be received by the user equipment at least in part in response to the reference signaling.

12. A method of operating a user equipment in a radio access network, the method comprising:
transmitting reference signaling based on a configuration, the configuration being configured based on a received signaling configuration message, the signaling configuration message indicating a parametrisation pertaining to the reference signaling and to communication signaling to be received by the user equipment at least in part in response to the reference signaling.

13. The method according to claim 12, wherein at least one of the reference signaling is sounding reference signaling and the communication signaling is one of physical downlink and sidelink signaling.

14. The method according to claim 12, wherein the signaling configuration message is one of a downlink and a sidelink control information message.

15. The method according to claim 12, wherein the parametrisation is indicated by at least one common indicator, the common indicator mapping to at least one parameter of the reference signaling and at least one parameter of the communication signaling.

16. The method according to claim 12, wherein the parametrisation pertains to frequency resources of the reference signaling and frequency resources of the communication signaling.

17. The method according to claim 12, wherein the parametrisation pertains to a first set of frequency resources of the reference signaling, the first set being a subset of a second set of frequency resources of the communication signaling.

18. The method according to claim 12, wherein parametrisation of the communication signaling is further indicated by a second configuration message.

19. The method according to claim 12, wherein transmission of the communication signaling is based on the reference signaling.

20. The method according to claim 12, wherein the communication signaling is associated to one of a data channel, sidelink shared channel, and a dedicated channel.

21. The method according to claim 12, wherein the communication signaling is one of scheduled and transmitted one of one, two and three symbol time intervals later in time than the reference signaling.

22. A user equipment for a radio access network, the user equipment being configured to:
transmit reference signaling based on a configuration, the configuration being configured based on a received signaling configuration message, the signaling configuration message indicating a parametrisation pertaining to the reference signaling and to reception signaling to be received by the user equipment at least in part in response to the reference signaling.

23. A computer storage medium storing an executable program comprising instructions that, when executed, cause processing circuitry to at least one of control and perform a method of operating a radio node in a radio access network, the method comprising:

configuring a user equipment with a signaling configuration message, the signaling configuration message indicating a parametrisation pertaining to reference signaling to be transmitted by the user equipment and to communication signaling to be received by the user equipment at least in part in response to the reference signaling.

* * * * *